June 10, 1930.  C. COLAGIURI  1,763,599
COMBINATION WHEEL WITH PISTON SPRINGS TIRE
Filed Feb. 11, 1929  2 Sheets-Sheet 1
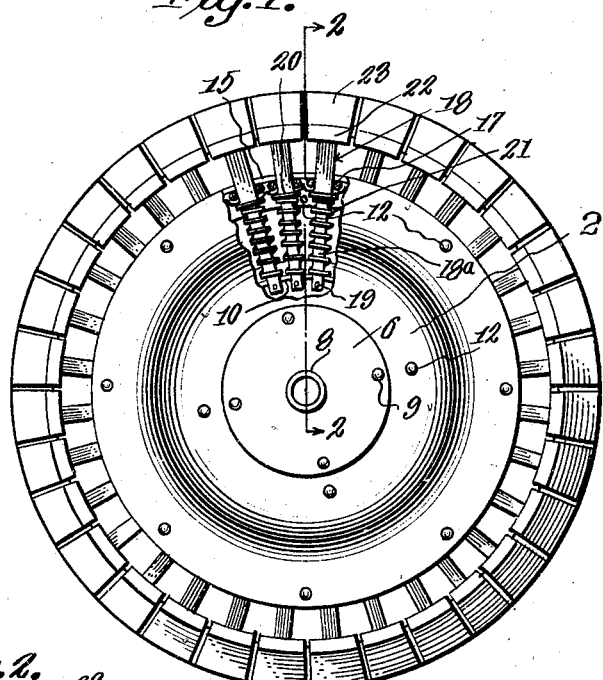
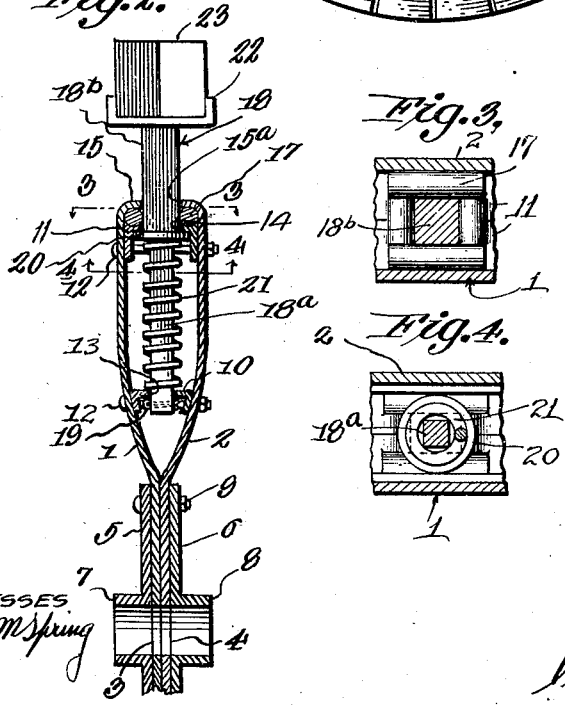
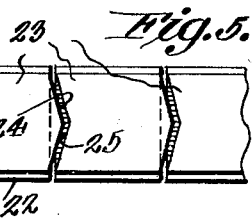
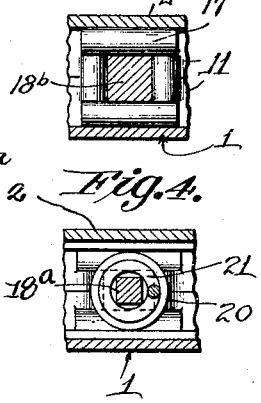
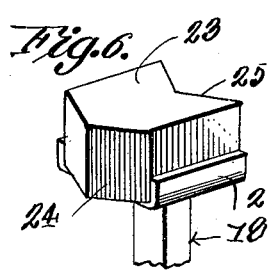
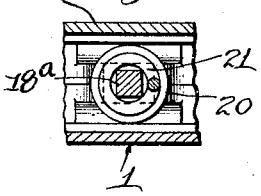
INVENTOR.
CARMELO COLAGIURI
BY
Irving L. Cattrau
ATTORNEYS.

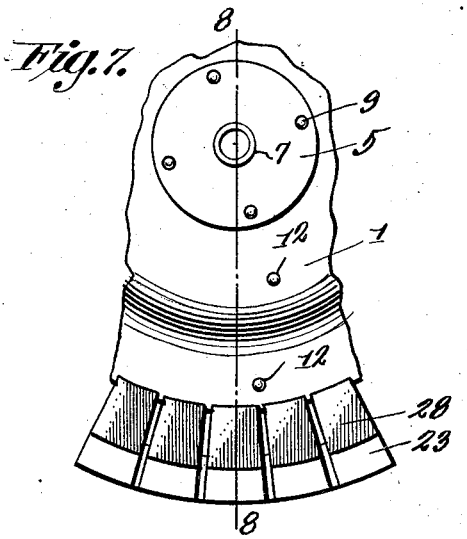
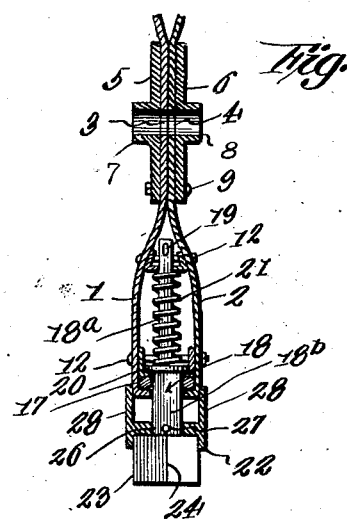
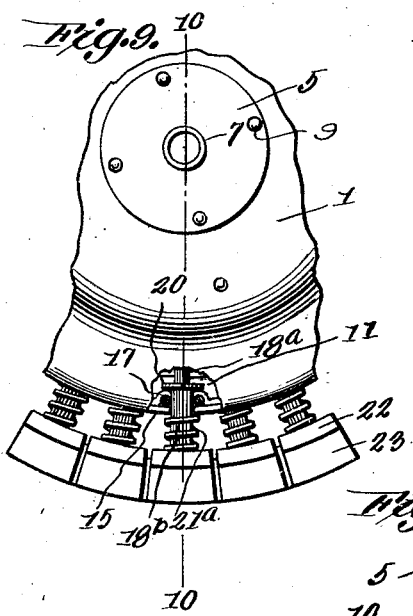
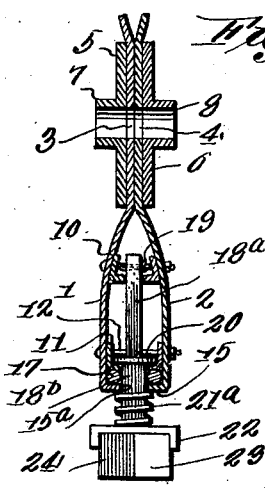
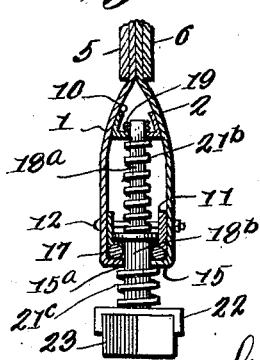

Patented June 10, 1930

1,763,599

UNITED STATES PATENT OFFICE

CARMELO COLAGIURI, OF HOUSTON, TEXAS

COMBINATION WHEEL WITH PISTON-SPRINGS TIRE

Application filed February 11, 1929. Serial No. 339,181.

This invention relates to wheels for motor vehicles and the like, and has for one of its objects to provide a novel wheel which shall be simple, strong and durable and which shall be adapted to dispense with the use of pneumatic tires and yet possess the advantages and one of the disadvantages incident to the use of such tires.

To attain the foregoing and other objects, the invention comprehends the provision of a wheel having a periphery consisting of independent elastic blocks, rods carrying the blocks and connected to the wheel for independent inward and outward radial movement with respect thereto, and springs normally maintaining the rods in their outermost position with the elastic blocks in angular alinement.

The invention also comprehends the provision of a wheel embodying metallic discs, and means for connecting the discs in relatively spaced relation and for slidably supporting the rods between the discs.

The invention also comprehends the provision of a wheel wherein said means shall be equipped with novel anti-friction bearings for the rods.

The invention is hereinafter more fully described and claimed, and illustrated in the accompanying drawings, wherein:

Figure 1 is a view partly in elevation and partly in vertical section of a wheel constructed in accordance with my invention;

Figure 2 is a sectional view taken on the plane indicated by the line 2—2 of Figure 1;

Figure 3 is a sectional view taken on the plane indicated by the line 3—3 of Figure 2;

Figure 4 is a sectional view taken on the plane indicated by the line 4—4 of Figure 2;

Figure 5 is a plan view of a fragmentary portion of the periphery of the wheel;

Figure 6 is a perspective view of one of the elastic blocks and a portion of the rod carrying the block;

Figure 7 is an elevational view of a fragmentary portion of a modified form of the wheel;

Figure 8 is a sectional view taken on the plane indicated by the line 8—8 of Figure 7;

Figure 9 is a view partly in side elevation and partly in vertical section of a fragmentary portion of a further modified form of the wheel;

Figure 10 is a sectional view taken on the plane indicated by the line 10—10 of Figure 9, and Figure 11 is a view similar to Figure 10 illustrating a still further modified form of the wheel.

The wheel comprises a pair of metallic discs 1 and 2. The inner or central portions of the discs 1 and 2 are arranged in contact with each other, and the outer portions of the discs are arranged in relatively spaced relation. This discs 1 and 2 are provided with central or axial openings 3 and 4. Plates 5 and 6 having outwardly directed hub sections 7 and 8, are secured by bolts 9 to the outer sides of the central portions of the discs 1 and 2 with the hub sections arranged in alinement with the openings 3 and 4.

The spaced outer portions of the discs 1 and 2 are secured together and maintained in proper spaced relation by an inner pair of rings 10 and an outer pair of rings 11 which are arranged in concentric relation to the axis of the wheel. The pairs of rings 10 and 11 are of U-form in cross section, and their side members or flanges are directed radially inward. The discs 1 and 2 and the pairs of rings 10 and 11 are secured in assembled relation by bolts 12 which pass through the discs and through the flanges of the pairs of rings. The pair of rings 10 is provided with openings 13, and the pair of rings 11 is provided with openings 14, which are of rectangular contour. The openings 13 are arranged in alinement with the openings 14, and the latter are larger than the former.

Flanges 15 extend axially inward from the peripheral edges of the discs 1 and 2, are arranged in spaced parallel relation to the pair of rings 11, and are provided with openings 15ª similar to and arranged in alinement with the openings 14. Anti-friction rollers 17 are arranged in rectangular formation around the openings 15ª and project for a slight distance inward beyond the walls of the openings of the pair of rings 11 and flanges 15.

The pair of rings 11 are depressed around the openings 15ª for receiving the rollers 17.

Rods 18 of rectangular formation in cross section, and having their inner portions 18ª smaller transversely than their outer portions 18ᵇ, are slidably arranged between the discs 1 and 2 with their inner portions passing through the openings of the pair of rings 10 and with their outer portions passing through the openings of the pair of rings 11 and flanges 15. The inner rod portions 18ª contact with the walls of the openings of the pair of rings 10, and the outer rod portions 18ᵇ contact with the anti-friction rollers 17, and due thereto the rods 18 are held against any rotary movement about their longitudinal axes.

Cotter pins 19 secured to the inner ends of the rods 18, and washers 20 secured to the inner ends of the rod portions 18ᵇ, cooperate with the pairs of rings 10 and 11 to limit the outward movement of the rods. Springs 21 mounted on the rod portions 18ª and bearing against the pair of rings 10 and the washers 20, yieldingly maintain the rods 18 in their outermost position. Socketed retaining members 22 are secured to the outer ends of the rods 18 and are open at their outer front and rear edges. Elastic blocks 23 which by preference are made from rubber, are carried by the members 22 and project outwardly beyond the same. The blocks 23 may be secured in any suitable manner to the members 22. The blocks 23 are provided at their front side with projections 24 and in their rear sides with recesses 25, which are of V-form in plan, and of which the former fit in the latter to provide the wheel with a substantially continuous elastic solid tire.

As shown in Figures 7 and 8, the block carrying members 22 may be provided with openings 26 for the reception of the outer ends of the rods 18 and may be secured to the rods by pins 27. These members may also be provided at their inner and outer lateral sides, as shown in these figures, with flanges 28 which extend radially inward therefrom and contact with the corresponding sides of the discs 1 and 2 to prevent any lateral play of said members.

As shown in Figures 9 and 10, the springs, which are here designated 21ª, may be mounted on the rods 18 between the flanges 15 and the block carrying members 22.

As shown in Figure 11, each of the rods 18 may be equipped with a pair of springs which are here designated 21ᵇ and 21ᶜ. The springs 21ᵇ are arranged between the ring 10 and the washers 20, and the springs 21ᶜ are arranged between the flanges 15 and the block carrying members 22.

From the foregoing description, taken in connection with the accompanying drawings, it will be understood that the blocks 23 constitute an elastic periphery for the wheel, and that each element of the periphery is yieldingly supported for independent inward and outward movement, with the result that the periphery will yield to any irregularity in the surface over which it is moving and prevent any jars or shocks from being transferred to the vehicle equipped with the wheel. Due to their construction, and to the manner in which they are connected to the wheel, the rods 18 will not bend or move circumferentially with respect to the wheel under any driving force that may be applied to the wheel or under any shock incident to violent contact between the tread elements and stones or irregularities in the roadway. The provision of the rod supporting means with the anti-friction bearings, permits the rods 18 to move freely inwardly and outwardly. It will also be understood that the wheel may be manufactured and sold at a comparatively low cost, and that it may be maintained in a high state of efficiency with comparatively little labor and expense.

While I have described the principle of the invention together with the structures which I now consider to be the best embodiments thereof, I wish it understood that the structures shown are merely illustrative and that such changes may be made therein when desired as fall within the scope of the invention as claimed.

What I claim is:

1. A wheel comprising a pair of discs, having their central portions depressed inward in abutting engagement with one another and their outer portions in spaced parallel relation, said spaced parallel portions defining an annular chamber, hub plates engaging the outer faces of the depressed portions having axial hub sleeves in alignment with openings formed in the discs, fastening elements extending through the depressed portions of the discs and hub plates, pairs of inner and outer rings having registering openings arranged between the outer portions of the discs and provided with flanges engaging the inner faces of the discs, fastening elements extending through the flanges and discs, spring pressed rods slidable in said aligning openings in the rings, and cushioning blocks carried by the outer ends of the rods.

2. A wheel comprising a pair of discs, having their central portions depressed inward in abutting engagement with one another and their outer portions in spaced parallel relation, said spaced parallel portions defining an annular chamber, hub plates engaging the outer faces of the depressed portions having axial hub sleeves in alignment with openings formed in the discs, fastening elements extending through the depressed portions of the discs and hub plates, pairs of inner and outer rings having registering openings arranged between the outer portions of the discs and provided with flanges engaging the inner faces of the discs, fastening elements extending through the flanges and discs, spring pressed rods slidable in said aligned openings in the rings, cushioning blocks carried by the outer ends of the rods, inwardly directed abutting flanges formed on the peripheries of the discs having openings therein for receiving said rods, and roller bearings engaging the rods and confined between the flanges of the discs and the outermost pair of rings.

In testimony whereof I affix my signature.

CARMELO COLAGIURI.